Nov. 14, 1933.　　　A. WILLIAMS　　　1,935,197

FLUID CUT-OFF

Filed Aug. 9, 1930

INVENTOR.
Arthur Williams.

BY O. I. Reece

ATTORNEY.

Patented Nov. 14, 1933

1,935,197

UNITED STATES PATENT OFFICE 1,935,197

FLUID CUT-OFF

Arthur Williams, Calumet City, Ill., assignor to The Superheater Company, New York, N. Y.

Application August 9, 1930. Serial No. 474,194

3 Claims. (Cl. 251—113)

My invention relates to the type of valve which is held against its seat by pressure of the fluid controlled by it and aims to provide a valve of this type adapted to cut off flow in either direction as desired.

The novel features of my invention will be pointed out in the appended claims, but in order that my invention may be fully understood, I will describe in detail, in connection with the accompanying drawing, an illustrative embodiment thereof. In the drawing, Fig. 1 is a longitudinal vertical section through a fluid cut-off in accordance with my invention, the ports appearing in the position permitting unrestricted flow.

Figure 1:
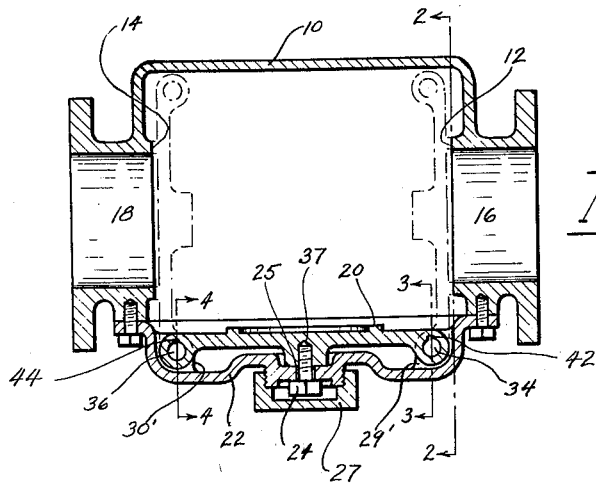
Figure 2:
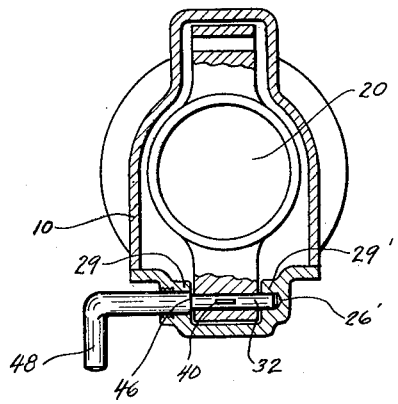
Fig. 2 is a section on the line 2—2 of Fig. 1 when the parts are in position to cut-off the flow, parts being broken away for purposes of illustration.
Figure 3:
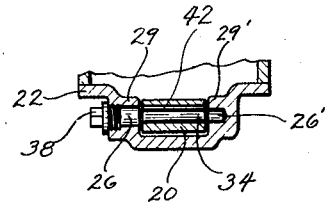
Fig. 3 is a fragmentary sectional view on line 3—3 of Fig. 1.
Figure 4:
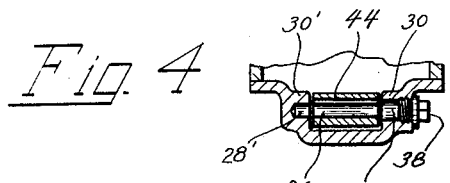
Fig. 4 is a similar view on line 4—4 of Fig. 1 and looking in the direction opposite to Fig. 3.

Referring to the drawing, casing 10 contains the two valve seats 12 and 14 facing each other and surrounding alined apertures 16 and 18 respectively. If an apparatus such as a feedwater heater is connected to receive water through the aperture 16, then the aperture 18 is connected to a pump. The casing 10 is of sufficient internal cross-section so that the water may flow through it without restriction during periods of ordinary use of the feedwater heater or other apparatus connected to the outlet 16. If now it is desired to test the apparatus connected to outlet 16 or 18 by hydraulic pressure without subjecting the apparatus connected to outlet 18 or 16 to such pressure, the cut-off valve in accordance with my invention permits this to be done by providing a valve 20 which is adapted to cooperate with either seat 12 or 14 as desired. Normally, as shown in Fig. 1, valve 20 is secured by any suitable means such as a bolt or cap-screw 24 to a plate 22 forming the bottom of casing 10. Bolt 24 normally extends through a central opening 25 in the plate 22 into a threaded socket 37 in the valve 20 so that such valve may be held out of the flow of fluid through the casing as long as desired and also so that it is normally held in fixed relation to two apertures 26 and 28 in casing 10. When the valve 20 is in the position shown in Fig. 1, the aperture 26 is at one end of plate 22, and the aperture 28 is then at the other end of plate 22. A cap 27 is fastened over hole 25 to prevent leakage.

The apertures 26 and 28 are formed in plate 22 at points where internal shoulders 29, 29' and 30, 30' project from the inner face of plate 22 adapted to receive the ends of valve 20 therebetween and to act as guides therefor. Shoulder 29' has a socket 26' therein in register with aperture 26, and shoulder 30' has an aperture 28' therein in register with aperture 28, the purpose of which will presently appear. The valve 20 has apertures 34 and 36 at its ends, aperture 34 being adapted to register with aperture 26 and socket 26' and aperture 36 being adapted to register with aperture 28 and socket 28' to receive a turning rod 32. When the rod 32 is in the apertures 26 and 34 and the cap screw 24 has been unscrewed, the valve 20 may be swung up into one of the dotted line positions shown in Fig. 1 to contact with the seat 12 and to cut off flow through the opening 16. In this position of the valve it will be seen that the valve is held against the seat 12 by the fluid pressure. If now it is desired to cut off flow through aperture 18 the valve may be swung back into the position illustrated in full lines, in Fig. 1, the cap-screw 24 replaced to hold the valve 20 in fixed position with relation to the plate 22 and the rod 32 thereupon shifted over and placed in the apertures 36 and 28. By turning the rod 32, the valve 20 may now be swung up against the seat 14 and it will be seen that in this position also the valve is held against the seat by the fluid pressure.

In order that fluid may not escape through the openings 34 and 36 through which the rod 32 is inserted, into the casing 10, plugs 38, 38 are provided for closing such openings at times when they are not occupied by rod 32.

It will be seen that the rod 32 has a key 40 fixed thereto and projecting laterally therefrom seated firmly therein and adapted to engage keyways 42 and 44 in the opposite ends of the valve 20 depending upon whether the rod 32 is in aperture 34 or 36. In order that the rod 32 may have a key for engaging the valve 20 and may also be readily removable and insertable in valve 20, the apertures 34 and 36 in the valve 20 are smaller than the apertures 26 and 28 in plate 22 and the latter have a diameter large enough to pass the rod 32 and the key 40 when the key is in place in the rod. The rod 32 has a shoulder 46 which closes the opening 34 or 36 through the casing when the rod is in place for use and may have a handle 48 whereby the rod 32 may be turned. However, I do not limit myself to a handle for turning rod 32.

The device herein disclosed may be used with the axis of apertures 16 and 18 arranged vertically if so desired. In such case, valve 20 will rest on the lower seat by its own weight. When valve 20 is to be used with the upper seat, however, it will be necessary to hold it against the upper seat until the pressure within casing 10 has built up sufficiently to support the valve. This initial holding closed of the valve may be done by hand by means of handle 48. When the seat 12 is uppermost, the arrangement of turning rod 32, key 40 and handle 48 illustrated in the drawing may be used to hold the valve initially against the seat by hanging a counterweight on the handle. However, a spring may be used or an operating rod may be provided having an operating rod whose handle and key way are relatively so arranged as to bring the handle 48 on the opposite side of the pivot point from valve 20 when the valve is used with seat 14.

It will be seen from the foregoing that a cut-off in accordance with my invention is adapted to prevent flow through a valve casing in either direction as desired and in each case the valve is pressed toward its seat by the fluid pressure.

What I claim is:

1. The combination with a casing having a passage-way therethrough and two opposed valve seats therein, of a valve in said casing and a turning rod therefor, said valve having a face adapted to make a fluid tight closure with either of said seats and having two spaced apertures therein each adapted to receive and to cooperate with said turning rod and having a recess on the face opposite said first mentioned face intermediate said apertures, and means adapted to cooperate with said recess for holding said valve in fixed position with respect to said casing when desired.

2. The combination with a casing having a passageway therethrough and two opposed valve seats therein, of a valve in said casing and a turning rod therefor, said valve having a face adapted to make a fluid-tight closure with either of said seats and having two spaced apertures therein each adapted to receive and to cooperate with said turning rod and having a recess intermediate said two apertures opening on the face of the valve opposite said first mentioned face, said casing having apertures adapted to register with said spaced apertures in the valve and an aperture adapted to register with said intermediate recess, and a bolt adapted to enter said mid-aperture for holding said valve when the valve is not in use and when said turning rod is being changed from one end of the valve to the other.

3. A fluid cut-off having a casing provided with two internal valve seats facing in opposite directions, a single valve within said casing having one face which is adapted to co-operate with either of said seats as desired, said casing, valve and seats being so constructed and arranged that the valve may be swung about either of two axes as desired to bring said one face into contact with either one of said seats depending on which axis is used and in which direction the valve is turned thereon.

ARTHUR WILLIAMS.